United States Patent
Peso Parada et al.

(10) Patent No.: US 11,662,259 B2
(45) Date of Patent: May 30, 2023

(54) BASELINE SIGNAL CALCULATION

(71) Applicant: Cirrus Logic International Semiconductor Ltd., Edinburgh (GB)

(72) Inventors: Pablo Peso Parada, London (GB); Tom Birchall, London (GB); Hamid Sepehr, London (GB); Filippo Rossi, London (GB)

(73) Assignee: Cirrus Logic, Inc., Austin, TX (US)

( * ) Notice: Subject to any disclaimer, the term of this patent is extended or adjusted under 35 U.S.C. 154(b) by 158 days.

(21) Appl. No.: 17/128,922

(22) Filed: Dec. 21, 2020

(65) Prior Publication Data

US 2022/0196497 A1 Jun. 23, 2022

(51) Int. Cl.
*G01L 1/26* (2006.01)
*G01L 5/16* (2020.01)
*G06F 3/041* (2006.01)

(52) U.S. Cl.
CPC .............. *G01L 1/26* (2013.01); *G01L 5/16* (2013.01); *G06F 3/0418* (2013.01); *G06F 3/041* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 9,164,605 B1 * | 10/2015 | Pirogov | G06F 3/04144 |
| 2006/0267953 A1 | 11/2006 | Peterson et al. | |
| 2014/0210257 A1 | 7/2014 | Buttolo et al. | |
| 2019/0102031 A1 * | 4/2019 | Shutzberg | G06F 3/0414 |

FOREIGN PATENT DOCUMENTS

WO 2021257287 A1 12/2021

OTHER PUBLICATIONS

Combined Search and Examination Report under Sections 17 and 18(3), UKIPO, Application No. GB2118314.0, dated Jun. 9, 2022.

* cited by examiner

*Primary Examiner* — Stephen T. Reed
(74) *Attorney, Agent, or Firm* — Jackson Walker L.L.P.

(57) ABSTRACT

A baseline unit for use in a sensor system, the sensor system comprising N force sensors which output N sensor signals, respectively, where N≥2, the baseline unit configured to: monitor measures of gradients of the respective sensor signals; and, in dependence upon the measures of the gradients, control a stored baseline setting to control how a baseline signal for at least one of said sensor signals is calculated using a baseline-calculation method, the baseline-calculation method configured by the currently-stored baseline setting.

18 Claims, 9 Drawing Sheets

BASELINE SIGNAL CALCULATION

FIELD OF DISCLOSURE

The present disclosure relates in general to sensor systems which comprise force sensors, and in particular to baseline signal calculation in relation to sensor signals obtained from such force sensors.

A baseline unit may be provided for use in such a sensor system to carry out baseline signal calculation.

BACKGROUND

Force sensors and sensor systems having force sensors may be provided for use with, or as part of, a host device. A host device having force sensors may be referred to as a sensor system or force sensor system.

In this context, a host device may be considered an electrical or electronic device and may be a mobile device. Example devices include a portable and/or battery powered host device such as a mobile telephone or smartphone, an audio player, a video player, a PDA, a mobile computing platform such as a laptop computer or tablet and/or a games device.

In general, a force sensor is configured to output a sensor signal indicative of a temporary mechanical distortion of a material under an applied force. The material may for example be a metal plate which is part of, or associated with, the force sensor, and which is pushed/pressed or otherwise deformed by a user. In the context of a host device, the material may be part of a chassis or external casing of the device. The force may for example be applied and subsequently reduced or removed in a user press operation, referred to as a button press where the force sensor is used to implement a button, the user press operation starting when the force is applied.

Force sensing may be carried out by a variety of different types of force sensor. Example types of force sensor include capacitive displacement sensors, inductive force sensors, strain gauges, piezoelectric force sensors, force sensing resistors (resistive force sensors), piezoresistive force sensors, thin film force sensors and quantum tunnelling composite-based force sensors. Force sensor systems may comprise a mixture of types of sensor/sensor technology.

Modern electronic devices are increasingly using "virtual button" technology to replace traditional push buttons. An example is the volume or power button on the side of a smartphone. The traditional push buttons have contacts that can age and wear, and virtual buttons not only avoid this problem, but can be made without introducing openings in the smartphone chassis, thus increasing waterproofing and reducing general exposure to dirt and grease.

To replace physical buttons, virtual buttons are implemented using a number of force sensors in a force sensor system as described above. In the context of a smartphone, as a convenient running example of a host device, a number of such sensors may be arranged on the inside of the chassis—e.g. on the inside left-side and/or right-side edges or on the front or back of the device. The sensors are then responsive to physical pressure applied to the chassis.

Generally, the objective is to define a certain region of the device chassis as corresponding to a virtual button, and to use sensor information to determine when that region of the chassis has enough applied force to constitute an associated button press. Often multiple regions are defined corresponding respectively to multiple virtual buttons.

Force sensors deployed in modern host devices produce signals that have a slowly varying baseline level that is modulated by physical events (e.g. changes in ambient temperature or pressure) that need to be detected. An example application is a button press sensor implemented by way of a force sensor.

A baseline level may be taken to mean a level (e.g. bias level) at which a corresponding sensor signal is taken to indicate a zero magnitude or zero input. In the case of a force sensor, a baseline level may be taken to mean a level at which a corresponding sensor signal is taken to indicate zero applied force. A baseline signal may be taken to mean a signal which indicates baseline level. Ultimately, force information may be determined from a given sensor signal based on a difference between that sensor signal and its corresponding baseline signal.

It has been found that existing techniques for determining a baseline signal corresponding to a sensor signal are unsatisfactory or open to improvement. It is desirable to provide an improved technique for determining baseline level, and for example a corresponding baseline unit configured to carry out baseline signal calculation.

SUMMARY

According to a first aspect of the present disclosure, there is provided a baseline unit for use in a sensor system, the sensor system comprising N force sensors which output N sensor signals, respectively, where N≥2, the baseline unit configured to: monitor measures of gradients of the respective sensor signals; and, in dependence upon the measures of the gradients, control a stored baseline setting to control how a baseline signal for at least one of said sensor signals is calculated using a baseline-calculation method, the baseline-calculation method configured by the currently-stored baseline setting.

In this way, how a baseline signal is calculated may be controlled based on the 'measures of the gradients' (or, more simply, gradients) of the respective sensor signals, which enables advantage to be taken of information carried by such measures of the gradients. For example, when the ambient temperature changes significantly (e.g. in a temperature shock), the measures of the gradients may all be positive or all be negative, or indicate that the gradients are all positive or all negative, and this can be detected to detect the significant temperature change and adjust how the baseline signal is calculated. References to "measures of gradients" may be taken as references to "gradients", in some arrangements. A gradient may be a rate of change.

The baseline unit may be configured to access the stored baseline setting, and calculate the baseline signal for the at least one of the sensor signals using the baseline-calculation method.

The baseline unit may be configured, for each force sensor, to: calculate a baseline signal from its sensor signal using the baseline-calculation method; and/or generate a baseline-corrected signal by subtracting its baseline signal from its sensor signal. Such a baseline-corrected signal may be indicative of (e.g. proportional to) an applied force.

The baseline unit may be configured to determine that a given event is underway if it is determined that the measures of the gradients of the sensor signals are all positive or all negative, or indicate that the gradients are all positive or all negative. If it is determined that the given event is underway, the stored baseline setting may be set to a value within a defined range corresponding to the given event.

The baseline unit may additionally, in order to determine that the given event is underway, determine that the measures of the gradients of the sensor signals are all above a threshold value, or indicate that the gradients are all above a threshold value (for example, by considering absolute values rather than signed values). The baseline unit may additionally, in order to determine that the given event is underway, determine that magnitudes of the sensor signals are all above a threshold value (for example, by considering absolute values rather than signed values).

The given event may comprise a temperature shock or a substantial change in the ambient temperature. The given event may comprise a pressure shock or a substantial change in the ambient pressure.

The baseline unit may be configured, if it is determined that the given event is underway, to set the stored baseline setting to a value dependent on a combination of some or all of the measures of the gradients, or on a combination of some or all of the gradients indicated by the measures. The combination may comprise an average of some or all of the measures of the gradients or of some or all of the gradients, such as a mean, median or mode. The combination may comprise a sum of some or all of the measures of the gradients or of some or all of the gradients, such as a weighted sum. The combination may comprise an absolute average of some or all of the measures of the gradients or of some or all of the gradients, such as an absolute mean, median or mode. The combination may comprise an absolute sum of some or all of the measures of the gradients or of some or all of the gradients, such as an absolute weighted sum.

The baseline unit may be configured, if it is determined that the given event is underway, to set the stored baseline setting based on a defined relationship such as a monotonic relationship between values of the baseline setting and values of the combination. The relationship may be a linear or stepped relationship.

The baseline unit may be configured, if it is determined that the given event is underway, to set the stored baseline setting to a different value for different ranges of values of the combination. There may be a monotonic relationship between the ranges of values and the corresponding values to which the baseline setting is set.

It may be that values of the baseline setting each comprise component values per force sensor. In such a case, for each force sensor, its baseline signal may be calculated using the baseline-calculation method as configured by its corresponding component value of the currently-stored baseline setting. The baseline unit may be configured to control the component values of the baseline setting separately, such as based on the respective measures of the gradients of the corresponding sensor signals.

The baseline-calculation method may comprise low-pass filtering defined by a filter parameter. In that case, the baseline setting may define a value of the filter parameter. The filter parameter may comprise a time constant, a filter coefficient, a forgetting factor and/or a corner frequency which defines the low-pass filtering, optionally a passband of the low-pass filtering. The control of the stored baseline setting in dependence upon the measures of the gradients may comprise controlling the baseline setting to increase the size of a passband of the low-pass filtering.

It may be that $N \geq 3$, or $N \geq 4$, or $N \geq 8$. It may be that each sensor signal is indicative of an applied force. It may be that the force sensors of the sensor system are arranged to detect an applied force corresponding to a press of at least one virtual button. It may be that the baseline unit is configured to store the baseline setting.

The monitored measures of the gradients may be smoothed measures of the gradients obtained by smoothing corresponding instantaneous measures of the gradients of the respective sensor signals. The baseline unit may be configured to calculate the smoothed measures of the gradients from the corresponding instantaneous measures of the gradients, optionally by low-pass filtering.

According to a second aspect of the present disclosure, there is provided a baseline unit for use in a sensor system, the sensor system comprising N force sensors which output N sensor signals, respectively, where $N \geq 1$, and a temperature sensor which outputs a temperature signal indicative of ambient temperature, the baseline unit configured to: monitor a measure of a gradient of the temperature signal; and in dependence upon the measure of the gradient, control a stored baseline setting to control how a baseline signal for at least one of said sensor signals is calculated using a baseline-calculation method, the baseline-calculation method configured by the currently-stored baseline setting.

The sensor system may comprise a plurality of temperature sensors which output a temperature signal indicative of ambient temperature. In that case, the baseline unit may be configured to monitor measures of gradients of the temperature signals, and control the stored baseline setting in dependence upon the measures of the gradients.

According to a third aspect of the present disclosure, there is provided a baseline unit for use in a sensor system, the sensor system comprising N force sensors which output N sensor signals, respectively, the baseline unit configured to: access a stored baseline setting; calculate a baseline signal for at least one of said sensor signals using a baseline-calculation method, the baseline-calculation method configured by the currently-stored baseline setting; monitor measures of gradients of the respective sensor signals; and in dependence upon the measures of the gradients, control the stored baseline setting to control how each baseline signal is calculated.

According to a fourth aspect of the present disclosure, there is provided a baseline unit for use in a sensor system, the sensor system comprising N force sensors which output N sensor signals, respectively, where $N \geq 2$, the baseline unit configured to: monitor gradients of the respective sensor signals; and, in dependence upon the gradients, control a stored baseline setting to control how a baseline signal for at least one of said sensor signals is calculated using a baseline-calculation method, the baseline-calculation method configured by the currently-stored baseline setting.

According to a fifth aspect of the present disclosure, there is provided a sensor system or a host device, comprising: a baseline unit according to any of the first to third aspects; and the N force sensors (where $N \geq 1$ or $N \geq 2$).

Also envisaged are corresponding method aspects, computer program aspects and storage medium aspects. Features of one aspect may be applied to another and vice versa.

BRIEF DESCRIPTION OF THE DRAWINGS

Reference will now be made, by way of example only, to the accompanying drawings, of which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
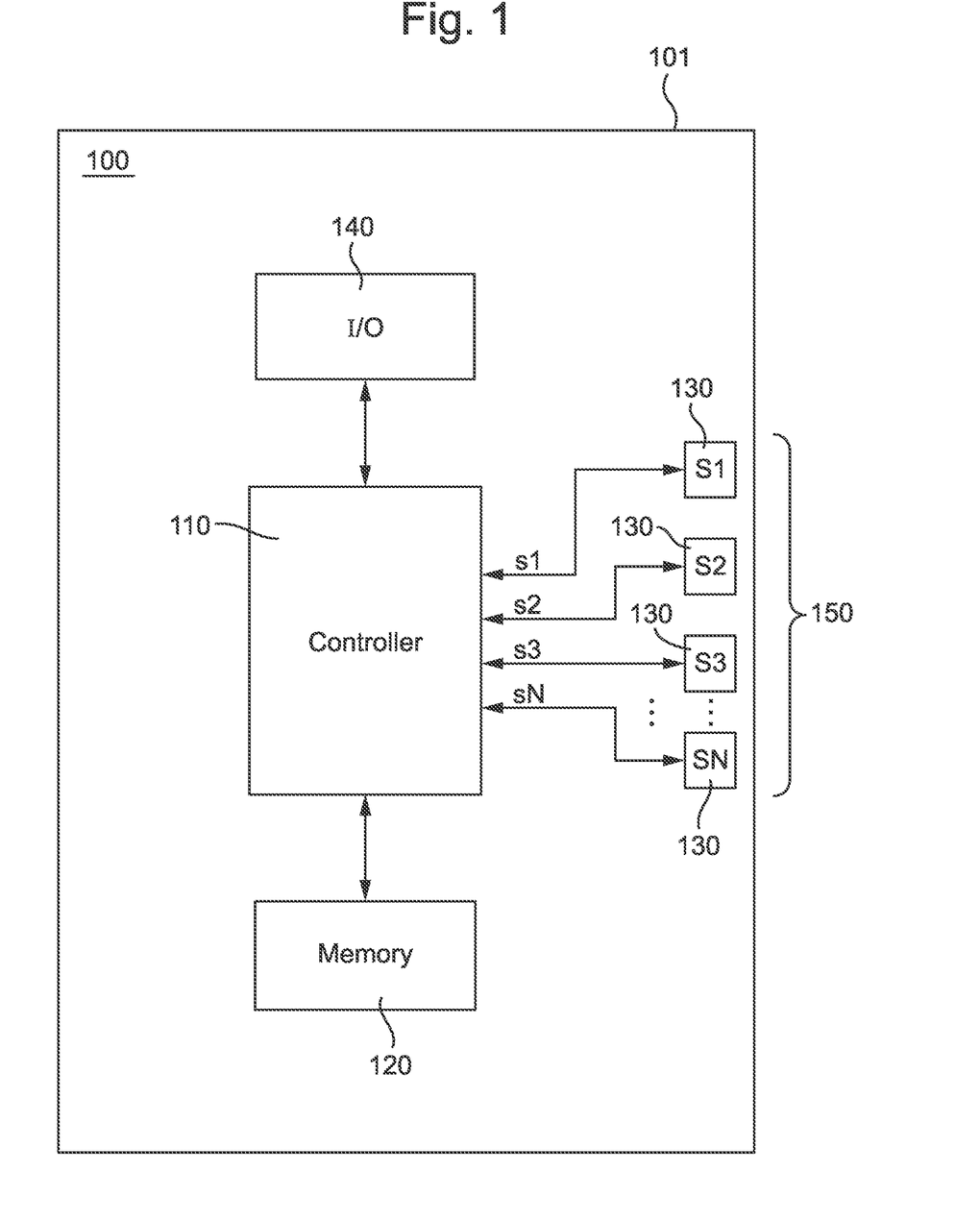
FIG. 1 is a schematic diagram of a host device according to an embodiment.

FIG. 1 is a schematic diagram of a host device 100 according to an embodiment, for example a mobile or portable electrical or electronic device. Example host devices 100 include a portable and/or battery powered host device such as a mobile telephone, a smartphone, an audio player, a video player, a PDA, a mobile computing platform such as a laptop computer or tablet and/or a games device.

As shown in FIG. 1, the host device 100 may comprise an enclosure 101, a controller 110, a memory 120, N force sensors 130, where N≥2, and an input and/or output unit (I/O unit) 140.

The enclosure 101 may comprise any suitable housing, casing, chassis or other enclosure for housing the various components of host device 100. Enclosure 101 may be constructed from plastic, metal, and/or any other suitable materials. In addition, enclosure 101 may be adapted (e.g., sized and shaped) such that host device 100 is readily transported by a user (i.e. a person).

Controller 110 may be housed within enclosure 101 and may include any system, device, or apparatus configured to control functionality of the host device 100, including any or all of the memory 120, the force sensors 130, and the I/O unit 140. Controller 110 may be implemented as digital or analogue circuitry, in hardware or in software running on a processor, or in any combination of these.

Thus controller 110 may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110, may be provided on a non-volatile carrier medium such as a disk, CD- or DVD-ROM, programmed memory such as read only memory (Firmware), or on a data carrier such as an optical or electrical signal carrier. The controller 110 may be referred to as control circuitry and may be provided as, or as part of, an integrated circuit such as an IC chip.

Memory 120 may be housed within enclosure 101, may be communicatively coupled to controller 110, and may include any system, device, or apparatus configured to retain program instructions and/or data for a period of time (e.g., computer-readable media). In some embodiments, controller 110 interprets and/or executes program instructions and/or processes data stored in memory 120 and/or other computer-readable media accessible to controller 110.

The force sensors 130 are housed within the enclosure 101, and are communicatively coupled to the controller 110. Each force sensor 130 may include any suitable system, device, or apparatus for sensing a force, a pressure, or a touch (e.g., an interaction with a human finger) and for generating an electrical or electronic signal in response to such force, pressure, or touch. Example force sensors 130 include or comprise capacitive displacement sensors, inductive force sensors, strain gauges, piezoelectric force sensors, force sensing resistors, piezoresistive force sensors, thin film force sensors and quantum tunnelling composite-based force sensors. There may be a mixture of types of force sensor amongst force sensors 130.

In some arrangements, the electrical or electronic signal generated by a force sensor 130 may be a function of a magnitude of the force, pressure, or touch applied to the force sensor (a user force input) via the enclosure 101. Such electronic or electrical signal may comprise a general purpose input/output (GPIO) signal associated with an input signal in response to which the controller 100 controls some functionality of the host device 100. The term "force" as used herein may refer not only to force, but to physical quantities indicative of force or analogous to force such as, but not limited to, pressure and touch.

The I/O unit 140 may be housed within enclosure 101, may be distributed across the host device 100 (i.e. it may represent a plurality of units) and may be communicatively coupled to the controller 110. Although not specifically shown in FIG. 1, the I/O unit 140 may comprise any or all of a microphone, an LRA (or other device capable of outputting a force, such as a vibration), a radio (or other electromagnetic) transmitter/receiver, a speaker, a display screen (optionally a touchscreen), an indicator (such as an LED), a sensor (e.g. accelerometer, temperature sensor, gyroscope, camera, tilt sensor, electronic compass, etc.) and one or more buttons or keys.

As a convenient example to keep in mind, the host device 100 may be a haptic-enabled device. As is well known, haptic technology recreates the sense of touch by applying forces, vibrations, or motions to a user. The host device 100 for example may be considered a haptic-enabled device (a device enabled with haptic technology) where its force sensors 130 (input transducers) measure forces exerted by the user on a user interface (such as a button or touchscreen on a mobile telephone or tablet computer), and an LRA or other output transducer of the I/O unit 140 applies forces directly or indirectly (e.g. via a touchscreen) to the user, e.g. to give haptic feedback. Some aspects of the present disclosure, for example the controller 110 and/or the force sensors 130, may be arranged as part of a haptic circuit, for instance a haptic circuit which may be provided in the host device 100. A circuit or circuitry embodying aspects of the present disclosure (such as the controller 110) may be implemented (at least in part) as an integrated circuit (IC), for example on an IC chip. One or more input or output transducers (such as the force sensors 130 or an LRA) may be connected to the integrated circuit in use.

Of course, this application to haptic technology is just one example application of the host device 100 comprising the plurality of force sensors 130. The force sensors 130 may simply serve as generic input transducers to provide input signals to control other aspects of the host device 100, such as a GUI (graphical user interface) displayed on a touchscreen of the I/O unit 140 or an operational state of the host device 100 (such as waking components from a low-power "sleep" state).

The host device 100 is shown comprising N force sensors 130, labelled S1 to SN, with their signals labelled s1 to sN, respectively. Although four sensors are shown explicitly, it will be understood that this is just a convenient example. It will be understood that the host device 100 generally need only comprise a plurality of (i.e. at least two) force sensors 130 (i.e. N=2) in connection with the techniques described herein, although N≥3 (e.g. N=4) may be considered advantageous in some arrangements. An example considering N=7 will be followed herein, however it will be recalled that in some cases it may be that N=2.

Although FIG. 1 is schematic, it will be understood that the sensors S1 to SN are located so that they can receive force inputs from a user, in particular a user hand or finger, during use of the host device 100. A particular user force input of interest in this context corresponds to a user touching, pushing, or pressing a virtual button, or swiping the device corresponding to time-staggered virtual button presses. A change in the amount of force applied may be detected, rather than an absolute amount of force detected, for example.

Thus, the force sensors S1 to SN may be located on the host device 100 according to anthropometric measurements of a human hand (e.g. so that a single human hand will be able to apply a force to multiple force sensors 130 in some cases). For example, the force sensors S1 to SN may be provided on the same side of the host device 100. Merely as a running example, it will be understood that the force sensors S1 to SN are provided in a linear array 150 as indicated in FIG. 1. It will be understood that, where N≥2, the force sensors 130 may be provided at different locations on the device, but may be in close proximity to one another.

Figure 2:
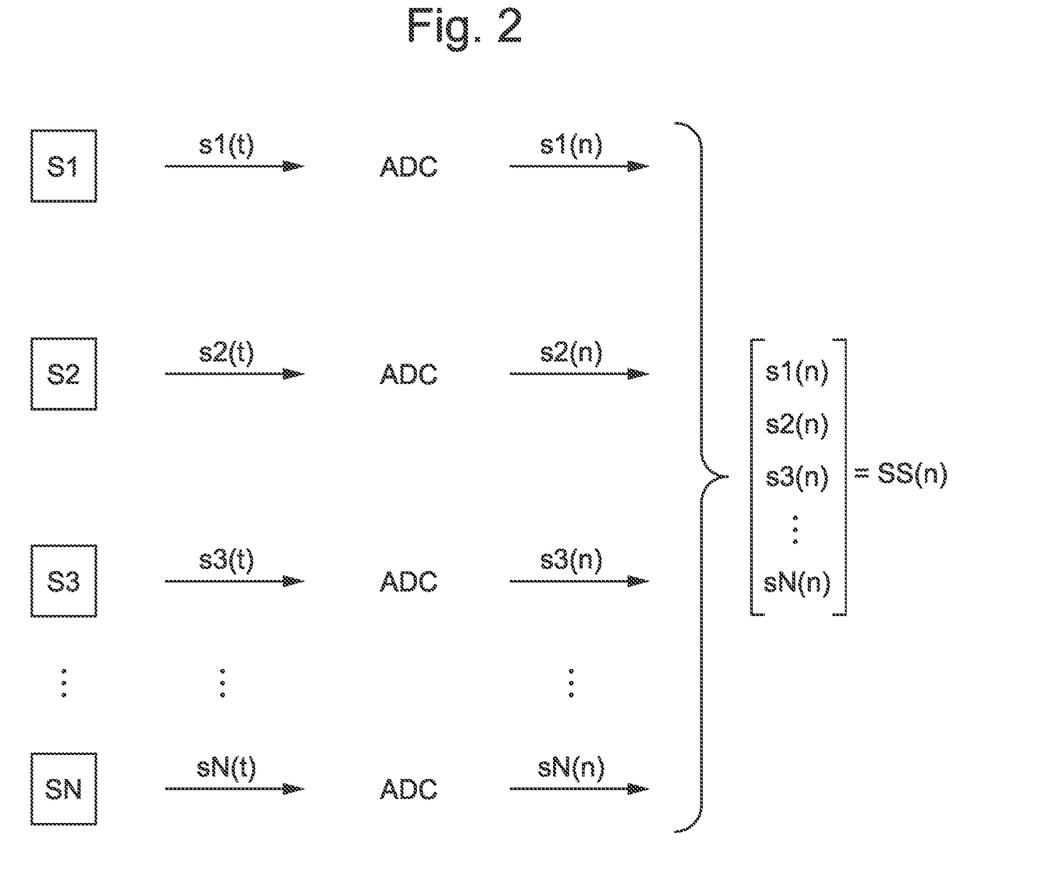
FIG. 2 is a schematic diagram indicating how signals from force sensors of the host device may be arranged and handled.

FIG. 2 is a schematic diagram indicating how the signals from the force sensors S1 to SN may be arranged and handled.

Depending on how the force sensors 130 are configured, the force sensors S1 to SN may provide analogue signals s1(t) to sN(t), respectively, where t is time e.g. in seconds. These analogue signals may then be converted by analogue-to-digital conversion, ADC, at a given (e.g. controllable) sample rate to corresponding digital sample streams s1(n) to sN(n), where n is the sample number. The combination of the digital sample streams s1(n) to sN(n) may be taken to form a stream of sensor samples SS(n) as indicated.

Of course, the force sensors S1 to SN may output respective digital sample streams s1(n) to sN(n) directly. The digital sample streams will be referred to hereinafter as signals for simplicity. It will be appreciated that the techniques described herein may be applied to such analogue or digital signals.

Figure 3:
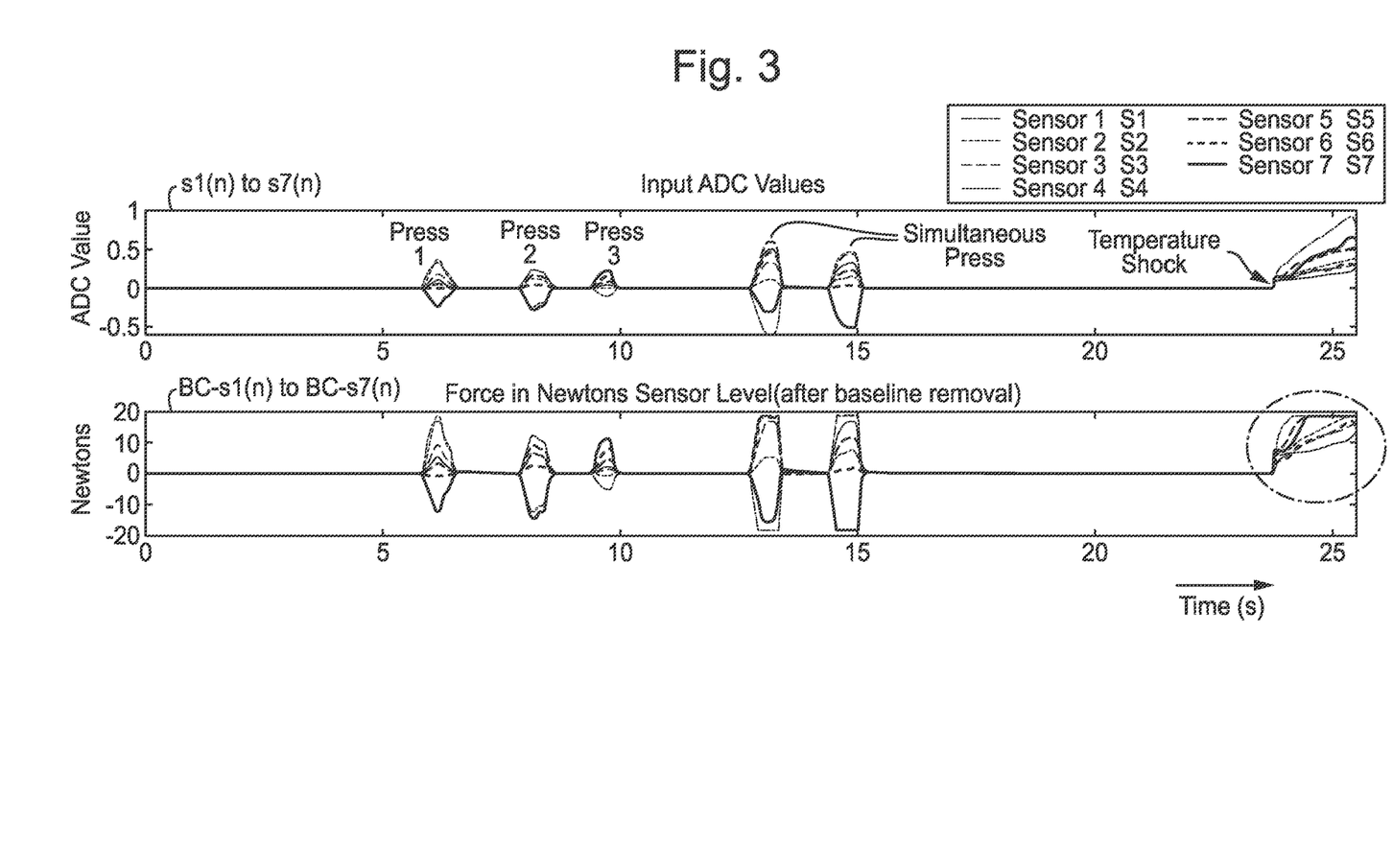
FIG. 3 shows a plot of example raw sensor signals and corresponding baseline-corrected signals.

To better appreciate problems that the techniques disclosed herein may address, FIG. 3 shows a plot of raw sensor signals s1(n) to s7(n) (i.e. without a baseline signal subtracted therefrom) from an example host device 100 where N=7, i.e. where the sensors 130 comprise sensors S1 to S7. Here, the signals s1(n) to s7(n) are plotted against time in seconds. It will be appreciated that corresponding analogue sensor signals s1(t) to s7(t) could be plotted, with the plots looking substantially the same (albeit with the y-axis showing analogue values).

Also shown are corresponding baseline-corrected signals, denoted BC-s1(n) to BC-s7(n), respectively. In each case, a corresponding baseline signal has been subtracted from the sensor signal concerned to generate the baseline-corrected signal concerned. The baseline signals will be referred to here as B-s1(n) to B-s7(n), respectively.

Taking sensor S1 as an example, it may therefore be said that:

$$BC\text{-}s1(n)=s1(n)-B\text{-}s1(n)$$

The baseline-corrected signals, BC-s1(n) to BC-s7(n), are shown in FIG. 3 as force signals, in Newtons, having been additionally converted (effectively scaled) into such force signals. It is appreciated that those signals could also be shown without such conversion.

It is assumed here that the baseline signals are generated by low-pass filtering their respective sensor signals, as an approximation of the biases (zero levels) of those sensor signals. It will also be assumed as a running example that the baseline signals are generated using a baseline tracking equation of the following form:

$$\text{baseline}(n)=\lambda \cdot \text{baseline}(n-1)+(1-\lambda)\cdot x(n)$$

where n is the sample number, baseline(n) is a given baseline signal (such as B-s1(n)), x(n) is the corresponding 'raw' sensor signal (such as s1(n)), and λ is a forgetting factor.

The forgetting factor λ effectively defines the low-pass filtering, for example its cutoff or corner frequency and thus its passband. The forgetting factor λ may be referred to as a filter coefficient. The forgetting factor λ may be taken to have a nominal value chosen for a given application to enable the baseline signal to track its sensor signal sufficiently to indicate the 'true' baseline level (given that the sensor signal predominantly represents zero force input, i.e. when a force is not being applied) but with sufficient high-frequency rejection to prevent it following button presses.

The signals shown in FIG. 3 correspond to three consecutive presses of different virtual buttons defined relative to the force sensors S1 to S7, followed by two consecutive simultaneous presses of different combinations of such virtual buttons, as indicated. Following this, the ambient temperature was markedly and rapidly changed (in a single direction) to simulate a temperature shock. In the case shown the temperature was increased, however this is just as an example.

Such a temperature shock could occur, for example, by taking the host device 100 from outside during winter (e.g. −20° C.) to inside a heated building (e.g. 20° C.). Of course, a temperature shock would similarly occur (but in the opposite fashion) if the host device 100 were taken from inside a heated building (e.g. 20° C.) to outside during winter (e.g. −20° C.).

As can be seen in FIG. 3, upon the temperature shock, the sensor signals and the baseline-corrected signals (as highlighted) both deflect from their 'at rest' levels. This is undesirable given that in fact at this point in FIG. 3 there is no button press. Effectively, the biases (true baseline levels) of the sensor signals are dramatically drifted in the presence of fast temperature changes, whereas the baseline signals calculated by low-pass filtering have not reflected this. This may create false positives, i.e. detection a button press even when none has occurred.

The inventors have explored this problem, and determined that the rate of change in the bias (true baseline level) is proportional to the rate of change of the temperature. In overview, arrangements disclosed herein seek to modify how the baseline signals are calculated from their sensor signals to avoid false positives. In the example of low-pass filtering provided above, this may be by modifying the cut-off frequency (forgetting factor) of the low pass filter used to estimate the bias of the sensors according to the rate of the temperature change when a temperature shock is detected. The arrangements disclosed herein exploit the inventors' discovery that in temperature shocks all the sensors signals increase or decrease together, i.e. either all signals increase or all signals decrease in value. When a temperature shock is detected, the forgetting factor $\lambda$ may be decreased to increase the cut-off frequency and enable the baseline signal to follow the sensor signal more closely (i.e. follow higher-frequency signal changes).

Figure 4A:
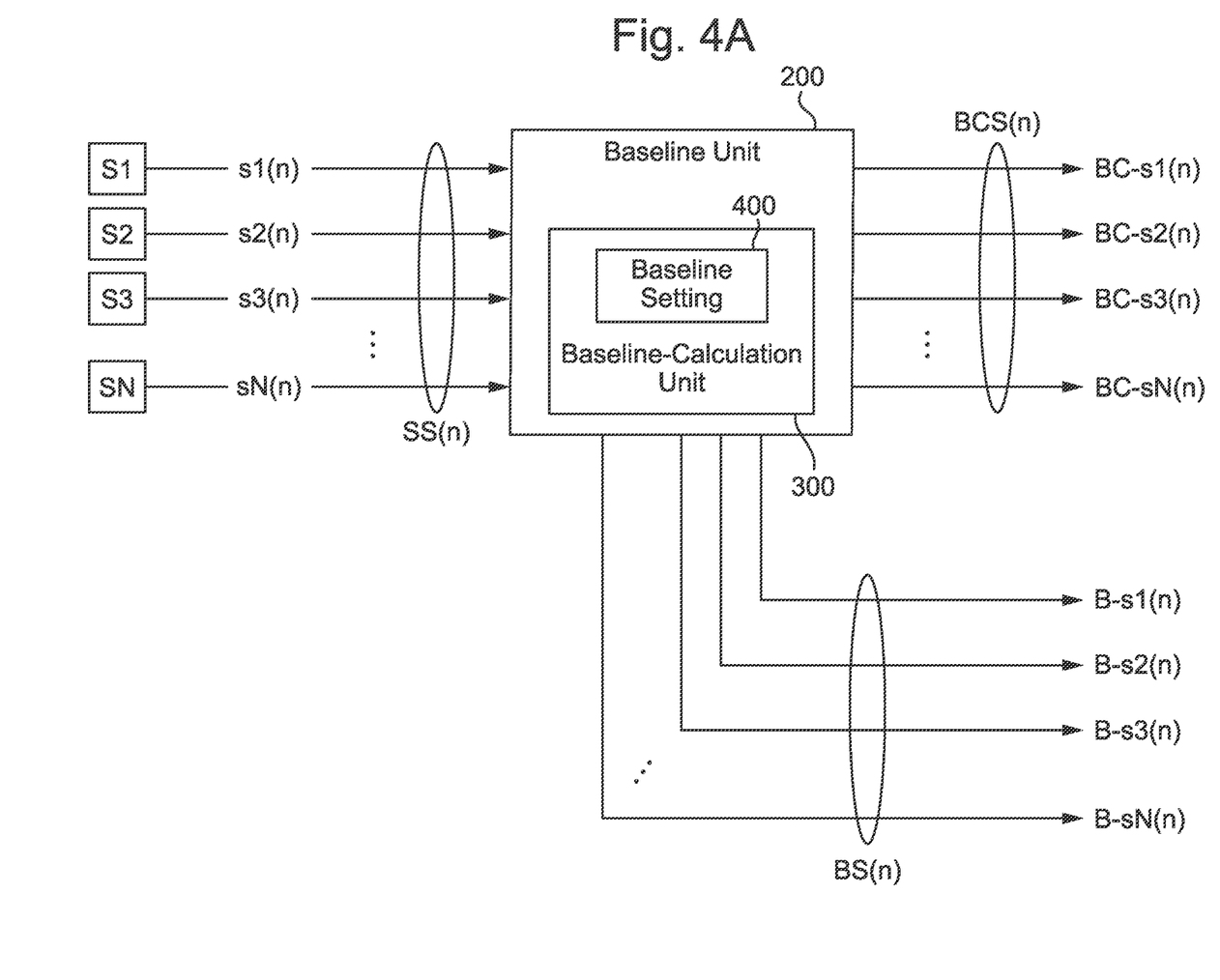
FIG. 4A is a schematic diagram of a baseline unit according to an embodiment.

With the above in mind, FIG. 4A is a schematic diagram of a baseline unit 200 according to an embodiment, and is shown as receiving digital sensor signals s1(n) to sN(n), from corresponding force sensors S1 to SN. In the general case, $N \geq 2$ as above although it will be apparent from FIG. 6A that $N \geq 2$ is also envisaged. The baseline unit 200 may be implemented in the host device 100, for example as, or as part of, the controller 110, and is shown as outputting two sets of signals. In one arrangement the baseline unit 200 may be implemented as program code running on the controller 110.

The first set of signals comprises baseline signals B-s1(n) to B-sN(n), which correspond respectively to sensor signals s1(n) to sN(n). Each baseline signal, e.g. B-s1(n), corresponds to a baseline signal for a given force sensor, in this case S1, and its sensor signal, in this case s1(n). Each baseline signal may therefore indicate the baseline level for its sensor. A stream of sensor samples SS(n) may thus give rise to a corresponding stream of baseline samples BS(n), as indicated.

The second set of signals comprises baseline-corrected signals BC-s1(n) to BC-sN(n), which correspond respectively to sensor signals s1(n) to sN(n). Each baseline-corrected signal, e.g. BC-s1(n), corresponds to a baseline-corrected signal for a given force sensor, in this case S1, and its sensor signal, in this case s1(n). Each baseline-corrected signal may therefore be intended to indicate the "true" signal level (e.g. applied force) for its sensor. A stream of sensor samples SS(n) may thus give rise to a corresponding stream of baseline-corrected samples BCS(n), as indicated.

It will be appreciated that the baseline unit 200 need not generate both the baseline streams and the baseline-corrected streams. For example, the baseline unit 200 might generate only the baseline streams, and pass those baseline streams onto another unit which also receives the sample streams and generates the baseline-corrected streams. In another arrangement, the baseline unit might generate the baseline-corrected streams directly and not output the baseline streams as such.

Figure 4B:
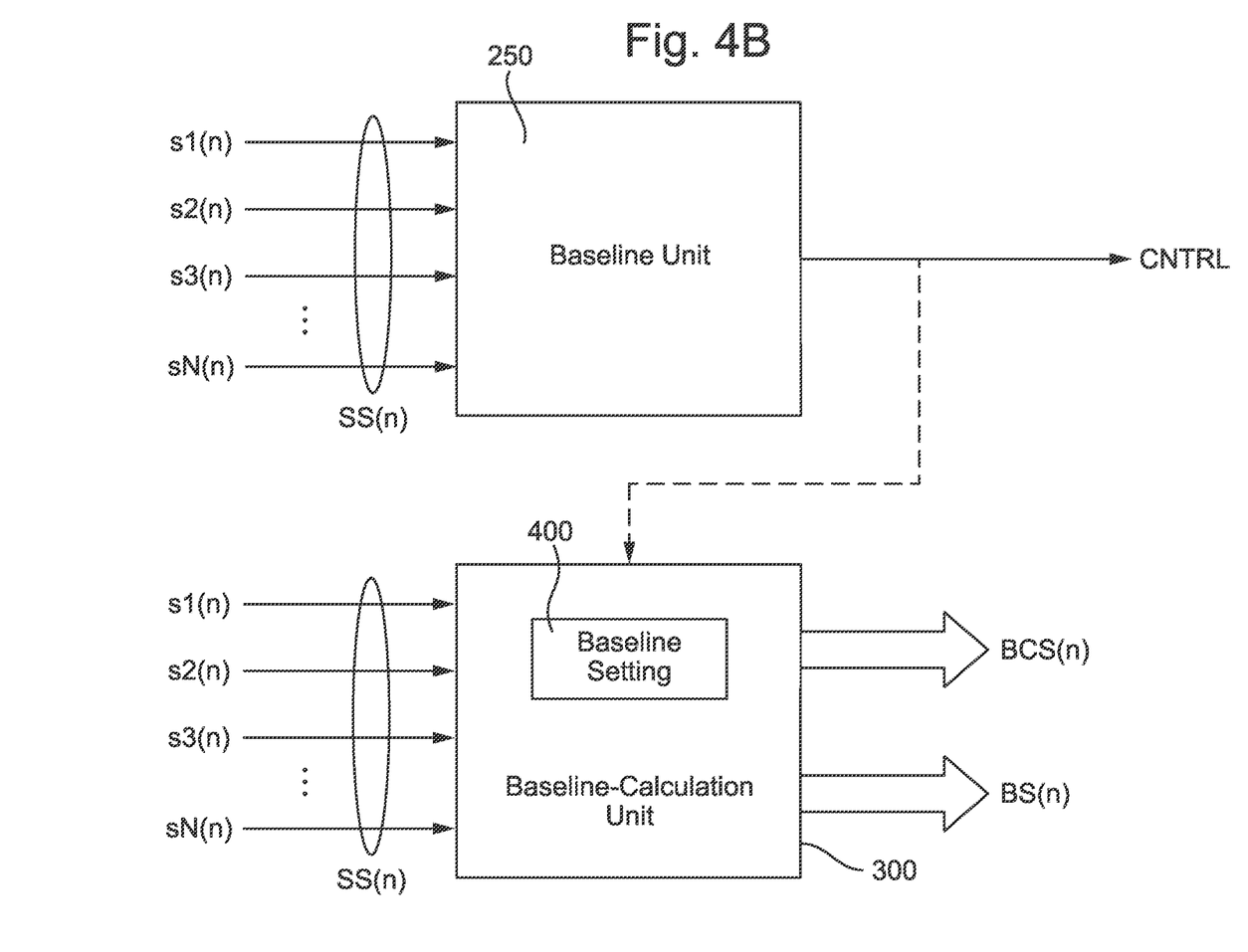
FIG. 4B is a schematic diagram of another baseline unit according to an embodiment.

The baseline unit 200 is shown as comprising a baseline calculation unit 300, which stores (or has access to) a baseline setting 400. In another arrangement, however, the baseline unit 200 may be replaced with a baseline unit 250 as in FIG. 4B provided without the baseline calculation unit 300, and may be configured to output a control signal CNTRL which is used to update a baseline setting 400 which is stored by (or accessed by) a separate baseline calculation unit 300. In that case, the separate baseline calculation unit 300 might also receive the sample streams and generate the baseline streams (shown in simplified form as BS(n)) and/or the baseline-corrected streams (shown in simplified form as BCS(n)).

Of course, even though $N \geq 2$, it may be that only one or more of the baseline signals B-s1(n) to B-sN(n) and/or the baseline-corrected signals BC-s1(n) to BC-sN(n) are generated, i.e. in respect of only one or more of the sensors 130.

Figure 5A:
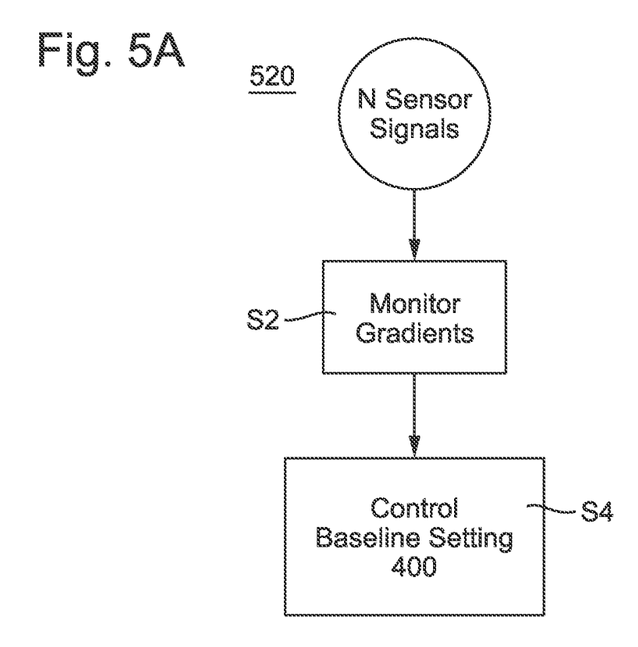
FIGS. 5A and 5B present methods useful for understanding functionality of the baseline units of FIGS. 4A and 4B.
Figure 5B:
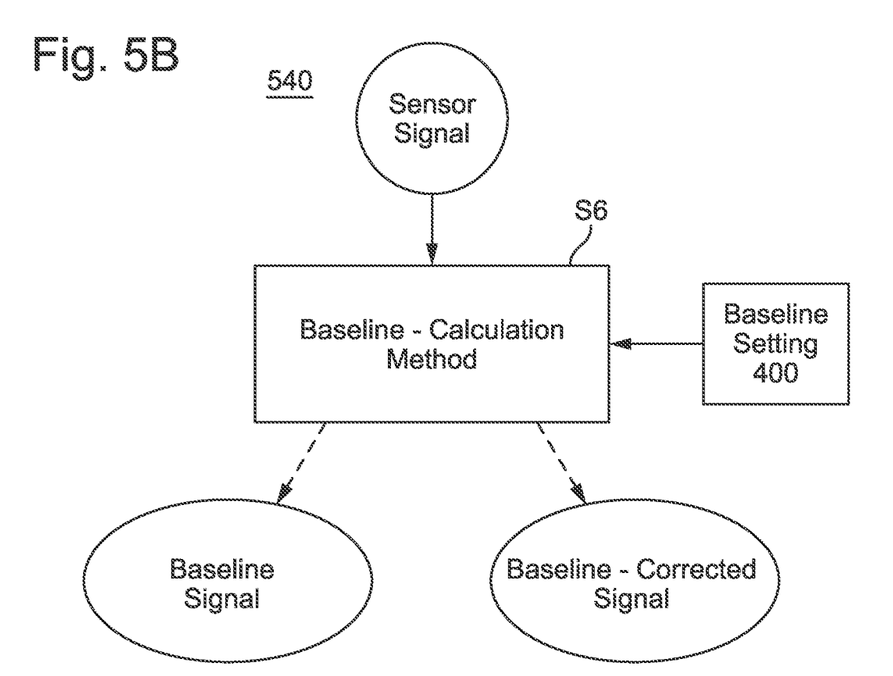

FIGS. 5A and 5B present methods 520 and 540, respectively, useful for understanding functionality of the baseline unit 200. Focus is placed on the baseline unit 200 for simplicity, but it will be appreciated that some of the functionality is also provided by baseline unit 250.

As above, the baseline unit 200 may be configured to store (internally or externally) a baseline setting 400.

Focussing first on method 520 of FIG. 5A, the baseline unit 200 is configured to (step S2) monitor gradients of the respective N sensor signals. In dependence upon the gradients, the baseline unit 200 is configured to (step S4) control the stored baseline setting 400 to control how a baseline signal for at least one of the sensor signals is calculated using a baseline-calculation method, the baseline-calculation method configured by the currently-stored baseline setting 400.

References to "gradients" may be taken as references to "measures of gradients". For example, the gradient of a sensor signal may be monitored or for example a difference between the sensor signal and another signal (such as its baseline signal or a reference signal) may be monitored as a measure of the gradient. For simplicity of explanation, focus will be placed hereinafter on monitoring gradients themselves however it will be understood that measures of gradients may be monitored.

For example, taking the low-pass filtering example considered earlier, the baseline setting 400 may define the low-pass filtering. That is, the baseline-calculation method may comprise low-pass filtering defined by a filter parameter, where the baseline setting 400 defines a value of the filter parameter. The filter parameter may comprise a time constant, a forgetting factor and/or a corner frequency which defines the low-pass filtering, optionally a passband of the low-pass filtering.

As in FIG. 4A, the baseline unit 200 may store the baseline setting 400 itself, however in other arrangements (see e.g. baseline unit 250) it may access the baseline setting 400 from external storage.

Turning to method 540 of FIG. 5B, the baseline unit 200 is configured, for each force sensor, to (step S6) calculate a baseline signal (e.g. B-s1(n)) from its sensor signal using the baseline-calculation method (step S10), and/or generate a baseline-corrected signal (e.g. BC-s1(n)) by subtracting its baseline signal (e.g. B-s1(n)) from its sensor signal (e.g. s1(n)). Method 540 may be carried out in respect to each force sensor, or any one or more of them.

Thus, how a baseline signal or baseline-corrected signal is generated in method 540 is dependent on the baseline setting 400 which is controlled in method 520 dependent on the gradients of the sensor signals. Continuing the low-pass filtering example, it will be apparent therefore that the cutoff frequency, corner frequency or passband of the low-pass filtering may be dependent on the gradients of the sensor signals.

Focussing on step S4 of method 520, the baseline unit 200 may be configured to determine that a given event is underway if it is determined that the gradients of the sensor signals are all positive or all negative.

The given event may be a temperature shock or other rapid and substantial change in ambient temperature (upwards or downwards), however it will be appreciated that other events (e.g. pressure shocks, potentially depending on how the host device is configured) may also cause the gradients of the sensor signals to be all positive or all negative.

If it is determined that the given event is underway, the baseline unit 200 may set the stored baseline setting 400 to a value within a defined range corresponding to the given event. Continuing the low-pass filtering example, it may be desirable to increase the cutoff frequency, corner frequency or size of the passband when it is determined that the given event is underway, so that the baseline signals will follow or track the sensor signals more closely (in the sense of following higher-frequency changes in the sensor signals). This may correspond to decreasing the forgetting factor $\lambda$ in the baseline tracking equation discussed earlier and repeated here:

$$\text{baseline}(n)=\lambda\cdot\text{baseline}(n-1)+(1-\lambda)\cdot x(n)$$

The stored baseline setting 400 may be changed to a value dependent on a combination of some or all of the gradients, when it is determined that the given event is underway. For example, the stored baseline setting 400 may be changed to a value dependent on an average (mean, median or mode) or sum (weighted, or unweighted) of the gradients, and may be based on an absolute average or sum (so as to treat positive and negative temperature excursions as equivalent).

In some arrangements, the baseline unit may set the stored baseline setting 400 based on a defined relationship, such as a monotonic relationship, between values of the baseline setting 400 and values of the combination (e.g. an absolute mean of the gradients). The relationship may be a continuously varying one, or may be divided into discrete ranges. For example, if it is determined that the given event is underway, the stored baseline setting 400 may be set to a different value for different ranges of values of the combination (e.g. an absolute mean of the gradients).

Figure 6:
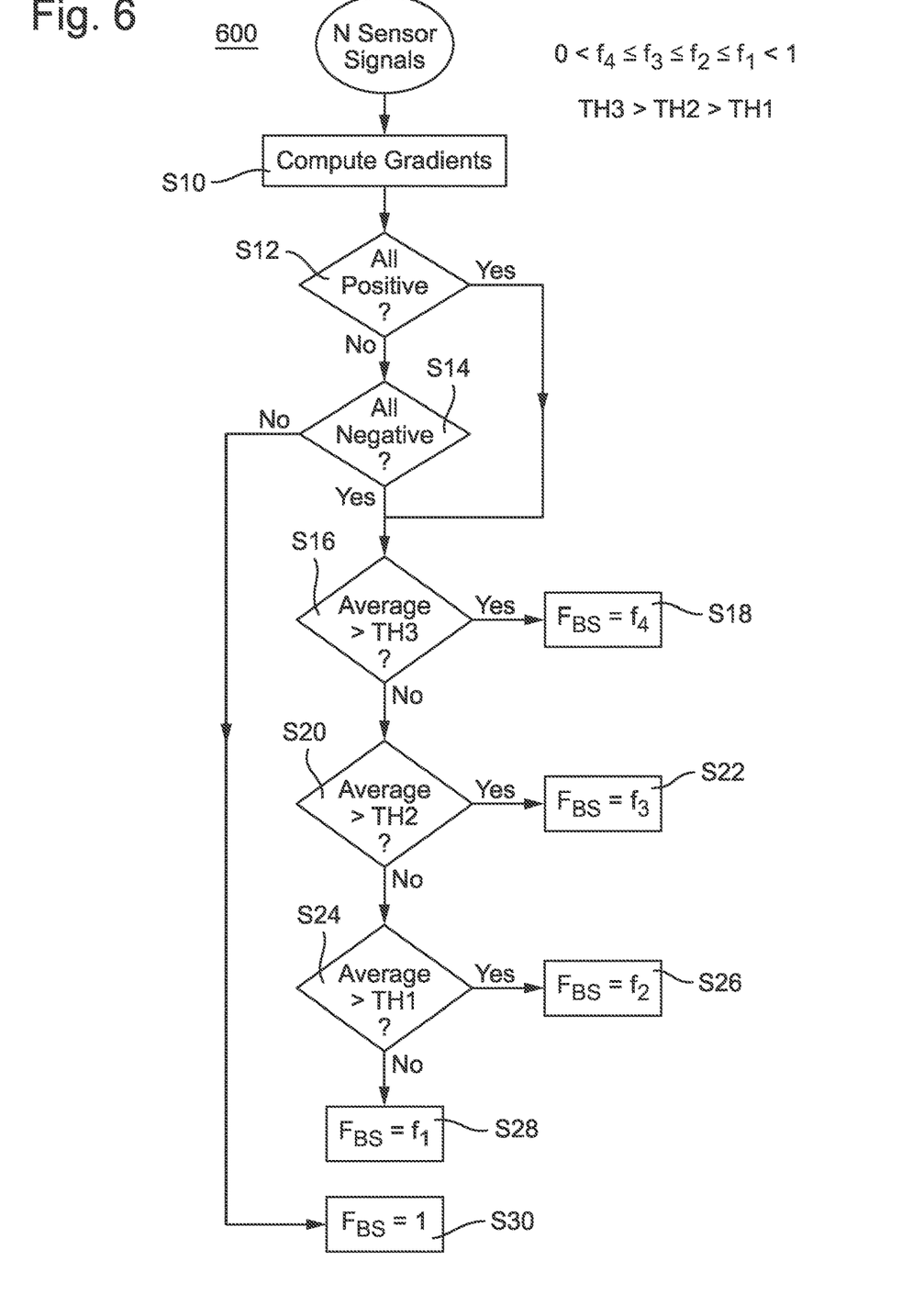
FIG. 6 shows an example method being an implementation of the method of FIG. 5A.

In this regard, an example application of the method 520 of FIG. 5A, will now be considered. Specifically, FIG. 6 shows an example method 600 being an implementation of the method 520.

In order to implement the baseline setting 400 in method 600, the forgetting factor $\lambda$ in the baseline tracking equation discussed earlier is implemented as follows:

$$\lambda = F_{BS} \cdot \lambda_{NOM}$$

where $\lambda$ is the overall forgetting factor as earlier, $\lambda_{NOM}$ is a nominal forgetting factor (assumed to be chosen for the particular application concerned) and $F_{BS}$ is a baseline-setting factor, taken here to be (or to be based on) the baseline setting 400.

Thus, the baseline tracking equation associated with FIG. 6 becomes:

$$\text{baseline}(n)=F_{BS}\cdot\lambda_{NOM}\cdot\text{baseline}(n-1)+(1-F_{BS}\cdot\lambda_{NOM})\cdot x(n)$$

Turning to FIG. 6 itself, in step S10 the gradients of the N sensor signals are determined or calculated, which may be by computation. The method then proceeds to step S12.

If all of the gradients are positive (S12, YES), the method proceeds to step S16. Otherwise (S12, NO), the method proceeds to step S14. If all of the gradients are negative (S14, YES), the method proceeds to step S16. Otherwise (S14, NO), the method proceeds to step S30. Thus, if all of the gradients are positive or all of the gradients are negative, corresponding to an event of interest such as a temperature shock, the method reaches step S16.

On the other hand, if not all of the gradients have the same sign (positive or negative), an event of interest such as a temperature shock has not been detected and the baseline-setting factor $F_{BS}$ is set to 1 in step S30. When $F_{BS}$ is 1, the overall forgetting factor $\lambda$ is the same as the nominal forgetting factor $\lambda_{NOM}$ so that the baseline tracking equation can operate using an overall forgetting factor $\lambda$ having a value chosen for the particular application concerned.

Assuming that an event of interest such as a temperature shock has been detected, steps S16, S20 and S24 then serve to set the baseline-setting factor $F_{BS}$ to potentially different values for different ranges of an average of the gradients. It will be assumed here that the average of interest is an absolute mean of the gradients, although this is just an example.

If the absolute mean of the gradients is greater than a threshold value TH3 (S16, YES), the baseline-setting factor $F_{BS}$ is set to a value f4. If the absolute mean of the gradients is greater than a threshold value TH2 but not greater than the threshold value TH3 (S16, NO, then S20, YES), the baseline-setting factor $F_{BS}$ is set to a value f3. If the absolute mean of the gradients is greater than a threshold value TH1 but not greater than the threshold value TH2 (S16, NO, then S20, NO, then S24, YES), the baseline-setting factor $F_{BS}$ is set to a value f2. If the absolute mean of the gradients is not greater than the threshold value TH1 (S16, NO, then S20, NO, then S24, NO), the baseline-setting factor $F_{BS}$ is set to a value f1.

Here, as indicated in FIG. 6, it is assumed that the baseline-setting factor $F_{BS}$ is a value between 0 and 1, and that the values f1 to f4 decrease in value in that order over the range 0 to 1. However, it may be that two or more of f1 to f4 are the same as one another. It is also assumed that threshold values TH1 to TH3 increase in that order.

Therefore, for a relatively large absolute mean of the gradients (e.g. greater than TH3) corresponding to a relatively large temperature shock, the baseline-setting factor $F_{BS}$ is set to the relatively low value f4. This in turn causes the overall forgetting factor $\lambda$ to be relatively low (much reduced compared to the nominal forgetting factor $\lambda_{NOM}$) so that the baseline signal tracks its sensor signal quite closely (and follows high-frequency changes to a high degree).

For a relatively low absolute mean of the gradients (e.g. less than TH1) corresponding to a relatively small temperature shock, the baseline-setting factor $F_{BS}$ is set to the relatively high value f1. This in turn causes the overall forgetting factor $\lambda$ to be relatively high. Nevertheless, because f1 is still lower than 1 the overall forgetting factor $\lambda$ is reduced compared to the nominal forgetting factor $\lambda_{NOM}$ (but not as much as for $F_{BS}$=f4). The baseline signal tracks its sensor signal more closely (and follows high-frequency changes better) than if the baseline-setting factor $F_{BS}$ is 1, but not nearly to the extent as for $F_{BS}$=f4.

As before, if even the basic requirement that all of the gradients have the same sign (positive or negative) is not met, $F_{BS}$=1 and the overall forgetting factor $\lambda$ is the same as the nominal forgetting factor $\lambda_{NOM}$.

Incidentally, the baseline unit 200 (or 250) may perform additional checks to detect an event of interest such as a temperature shock. For example, the baseline unit 200 (or 250) may determine that the gradients are all above a threshold value (for example, by considering absolute values rather than signed values). For example, the baseline unit 200 (or 250) may determine that magnitudes of the sensor signals are all above a threshold value (for example, by considering absolute values rather than signed values).

Figure 7:
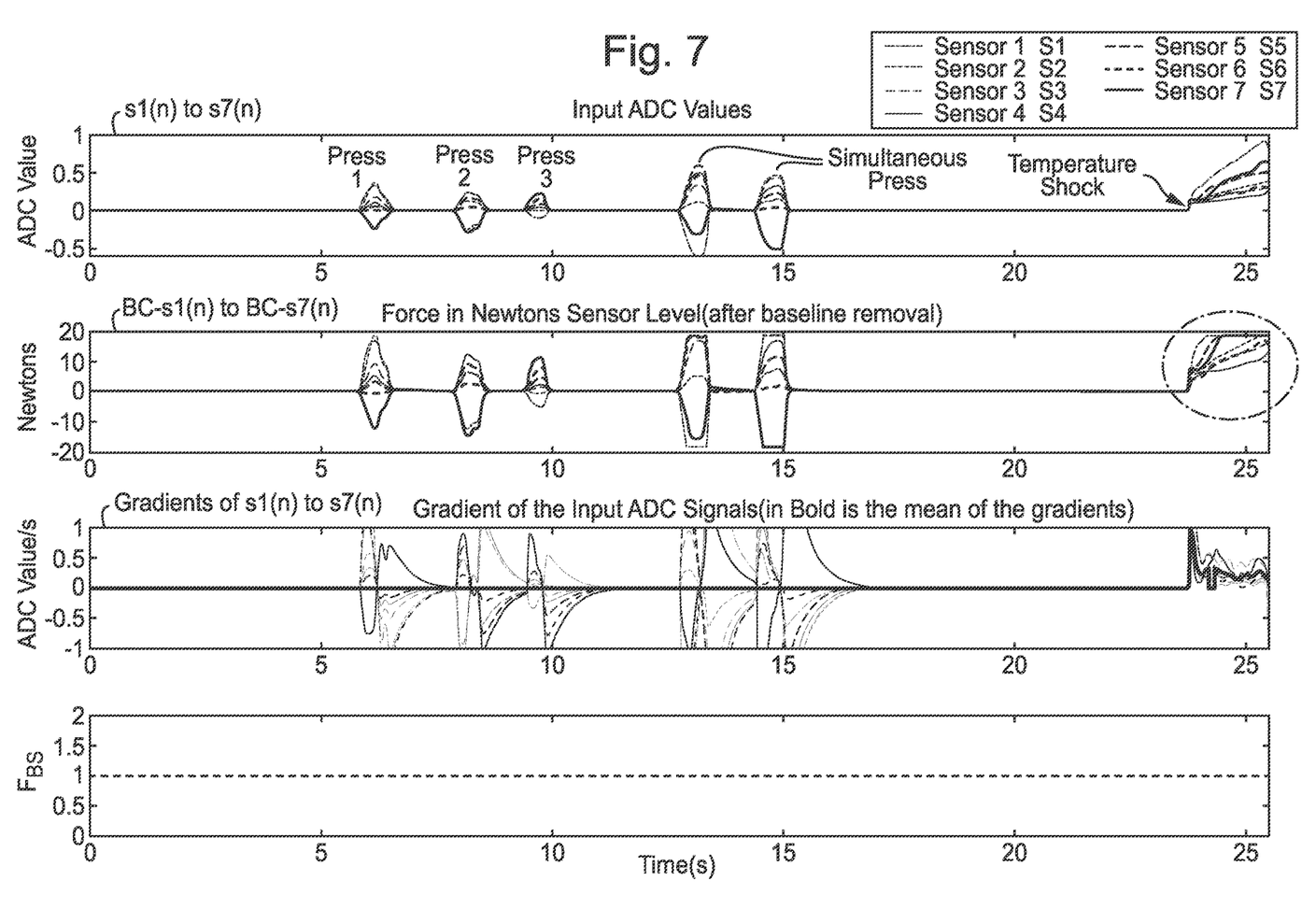
FIGS. 7 and 8 show plots of signals useful for understanding the methods of FIGS. 5B and 6.
Figure 8:
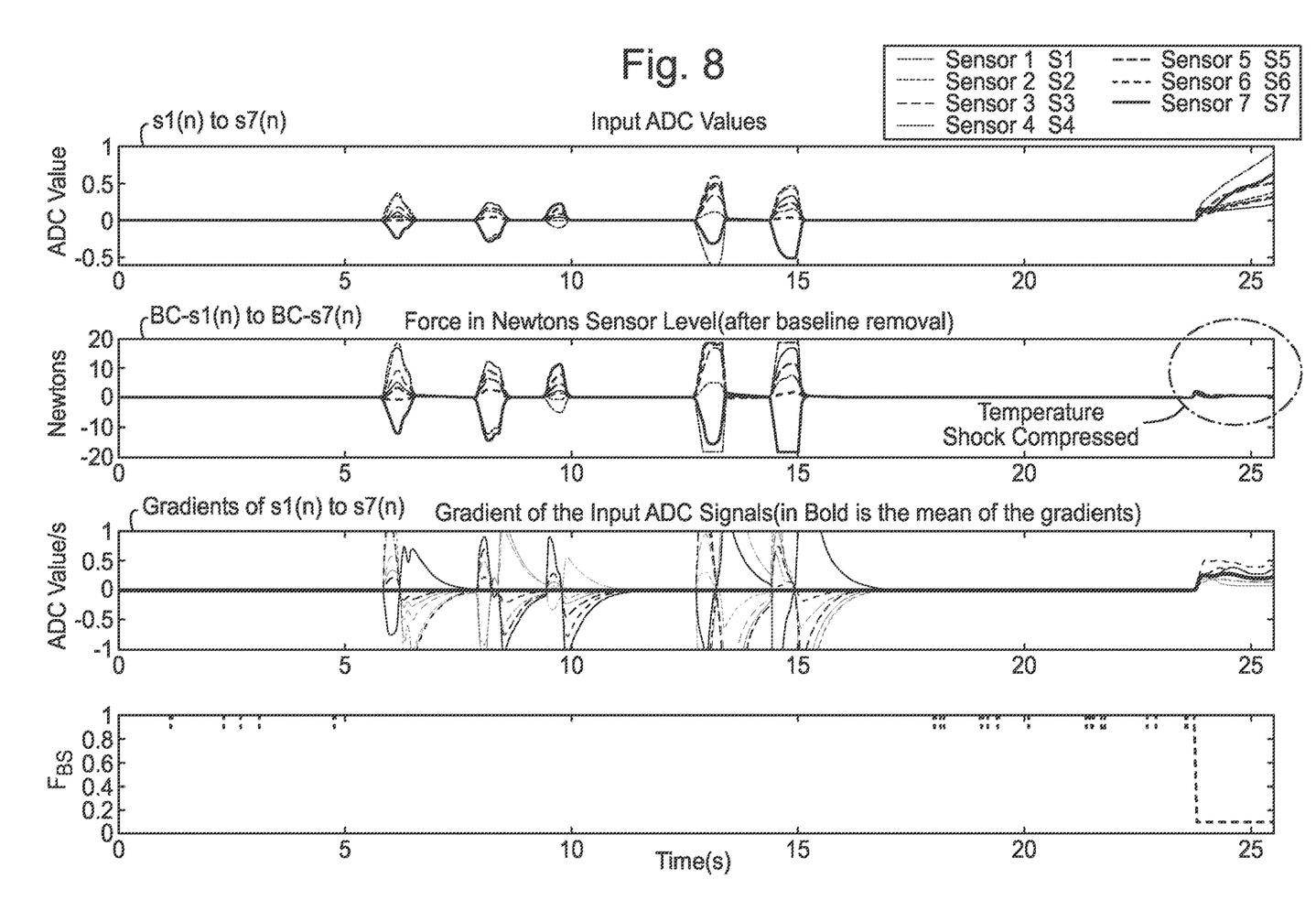

FIGS. 7 and 8 show the same plots of raw sensor signals s1(n) to s7(n) as in FIG. 3, but with corresponding baseline-corrected signals BC-s1(n) to BC-s7(n) generated according to methods 540 (of FIG. 5B) and 600 (of FIG. 6). Therefore, also shown are plots of the gradients of the raw sensor signals s1(n) to s7(n), and the applied baseline-setting factor $F_{BS}$. The mean of the gradients is also shown. The difference between FIGS. 7 and 8 is that for FIG. 7 the values of f1 to f4 are all set to 1 (as a comparative example), whereas for FIG. 8 the values of f1 to f4 are different from one another (and not equal to 1) so that they are distributed across the range from 0 to 1.

FIG. 7 accordingly shows the case where the baseline-setting factor $F_{BS}$ does not have any effect so that the overall forgetting factor $\lambda$ is consistently the nominal forgetting factor $\lambda_{NOM}$. As seen in FIG. 7, the baseline-setting factor $F_{BS}$ remains at the value 1.

Thus, FIG. 7 corresponds to a case where benefits of the present invention are not enjoyed—that is, the baseline setting 400 is effectively not controlled in dependence upon the gradients.

In contrast, FIG. 8 shows the case where benefits of the present invention are enjoyed—i.e. the baseline setting 400 is controlled in dependence upon the gradients. Specifically, upon detecting the temperature shock in step S12 (when all of the gradients are positive), the method 600 sets the baseline-setting factor $F_{BS}$ to a low value (lower than 0.2, in FIG. 8) so that the low-pass filtering of the baseline-calculation method (S6 of method 540, with the baseline tracking equation associated with FIG. 6) is adjusted to have a substantially increased passband. Therefore, the baseline signals B-s1(n) to B-s7(n), not shown, track the raw sensor signals s1(n) to s7(n) more closely than before, and as such the baseline-corrected signals BC-s1(n) to BC-s7(n) substantially remain at around the zero Newtons level, except for a tiny excursion which occurs before the baseline signals respond to the temperature shock.

Thus, as can be seen from FIG. 8, the method 600 (being an implementation of the method 520) advantageously serves to compensate for the applied temperature shock.

Incidentally, it will be noted (in relation to the temperature shock) that the gradient signals differ between FIGS. 7 and 8, despite the raw sensor signals s1(n) to s7(n) being the same. This is because, in the detailed implementation used to generate the signals, the sample rate (used for capturing the raw sensor signals s1(n) to s7(n)) is varied based on the level of the baseline-corrected signals BC-s1(n) to BC-s7(n), and these latter signals of course differ between FIGS. 7 and 8 at the temperature shock.

The gradient signals employed in the methods 520 and 600 may be instantaneous gradients calculated from the sensor signals concerned, or could be smoothed gradients for example calculated by low-pass filtering the instantaneous gradients.

For example, the gradient signals may be generated using a gradient tracking equation of the following form:

$$\text{gradient}(n) = \lambda_{GRAD} \cdot \text{gradient}(n-1) + (1-\lambda_{GRAD}) \cdot [x(n) - x(n-1)]$$

where n is the sample number, gradient(n) is the smoothed gradient signal for a given baseline signal (such as B-s1(n)), x(n) is the corresponding sensor signal (such as s1(n)), and $\lambda_{GRAD}$ is a forgetting factor. The instantaneous gradient then corresponds to x(n)−x(n−1), and for these purposes the sensor signal x(n) may be normalised before computing the difference so that gradients are comparable.

Although the baseline setting 400 has been described thus far as if a single setting is used in common for all sensor signals, in some arrangements values of the baseline setting each comprise component values per force sensor (so that each force sensor is dealt with individually, even in terms of the forgetting factor applied). In this case, for each force sensor, its baseline signal is calculated using the baseline-calculation method (see step S6) as configured by its corresponding component value of the currently-stored baseline setting. This enables, for example, those sensor signals which have larger gradients to use lower overall forgetting factors A, and, conversely, those sensor signals which have smaller gradients to use higher overall forgetting factors A. That is, the component values of the baseline setting 400 may be controlled separately, such as based on the respective gradients of the corresponding sensor signals.

Incidentally, methods 520 and 600 have been described in relation to monitoring gradients of the sensor signals themselves as indicative of an event of interest such as a temperature shock. Of course, where temperature is concerned, a temperature sensor could be provided to output a temperature signal indicative of ambient temperature. In this case, methods 520 and 600 could be adapted to monitor a gradient of the temperature signal, and, in dependence upon the gradient, control the stored baseline setting 600 to control how a baseline signal for at least one of the sensor signals is calculated using the baseline-calculation method, the baseline-calculation method configured by the currently-stored baseline setting. Of course, temperature sensors could be provided at sensor locations, and give per sensor temperature information.

For example, steps S10, S12 and S14 in method 600 could be replaced with a single step which computes the gradient of the temperature signal. Steps S16, S20 and S24 could be adapted to compare the computed gradient rather than an average with the thresholds TH1/TH2/TH3. Further step S30 could be removed and f1 could be set to 1 so that below a certain gradient of temperature change $F_{BS}$=1 and the overall forgetting factor $\lambda$ is the same as the nominal forgetting factor $\lambda_{NOM}$.

The skilled person will recognise that the force sensors referred to herein are an example type of sensor, and that the techniques described herein may be applied to sensor systems having sensors in general. As such, references to a force sensor may be replaced by references to a sensor or to an electrical or electronic sensor or to an input transducer.

Although the baseline setting has been described in some arrangements above as being applied in common across sensor signals, values of the baseline setting may comprise component values per force sensor. The above arrangements will be understood accordingly. For example, the baseline unit may be configured, for each force sensor, to calculate its baseline signal using the baseline-calculation method as configured by its corresponding component value of the currently-stored baseline setting. That is, the baseline signals may be calculated differently from one another, i.e. dealt with on a per sensor signal basis.

The skilled person will recognise that some aspects of the above described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the baseline unit 200 or 250 may be implemented as a processor operating based on processor control code. As another example, the controller 110 may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented (at least in part) as an integrated circuit (IC), for example on an IC chip. One or more input or output transducers (such as force sensors 130) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A baseline unit for use in a sensor system, the sensor system comprising N force sensors which output N sensor signals, respectively, where N≥2, the baseline unit configured to:
monitor measures of gradients of the respective sensor signals;
in dependence upon the measures of the gradients, control a stored baseline setting to control how a baseline signal for at least one of said sensor signals is calculated using a baseline-calculation method, the baseline-calculation method configured by the currently-stored baseline setting;
determine whether the measures of the gradients of the sensor signals indicate that the gradients are all positive or all negative;
determine that a given event is underway if it is determined that the measures of the gradients of the sensor signals indicate that the gradients are all positive or all negative; and
if it is determined that the given event is underway, set the stored baseline setting to a value within a defined range corresponding to the given event.

2. The baseline unit as claimed in claim 1, configured to:
access the stored baseline setting; and
calculate the baseline signal for said at least one of said sensor signals using the baseline-calculation method.

3. The baseline unit as claimed in claim 2, configured, for each force sensor, to:
calculate a baseline signal from its sensor signal using the baseline-calculation method; and/or generate a baseline-corrected signal by subtracting its baseline signal from its sensor signal.

4. The baseline unit as claimed in claim 1, wherein the given event comprises a temperature shock or a substantial change in the ambient temperature.

5. The baseline unit as claimed in claim 1, configured, if it is determined that the given event is underway, to set the stored baseline setting to a value dependent on a combination of some or all of the measures of the gradients, or on a combination of some or all of the gradients indicated by the measures.

6. The baseline unit as claimed in claim 5, wherein the combination comprises:
- an average of some or all of the measures of the gradients or of some or all of the gradients, such as a mean, median or mode; or
- a sum of some or all of the measures of the gradients or of some or all of the gradients, such as a weighted sum; or
- an absolute average of some or all of the measures of the gradients or of some or all of the gradients, such as an absolute mean, median or mode; or
- an absolute sum of some or all of the measures of the gradients or of some or all of the gradients, such as an absolute weighted sum.

7. The baseline unit as claimed in claim 5, configured, if it is determined that the given event is underway, to set the stored baseline setting based on a defined relationship such as a monotonic relationship between values of the baseline setting and values of the combination.

8. The baseline unit as claimed in claim 5, configured, if it is determined that the given event is underway, to set the stored baseline setting to a different value for different ranges of values of the combination.

9. The baseline unit as claimed in claim 8, wherein there is a monotonic relationship between the ranges of values and the corresponding values to which the baseline setting is set.

10. The baseline unit as claimed in claim 1, wherein:
values of the baseline setting each comprise component values per force sensor; and
for each force sensor, its baseline signal is calculated using the baseline-calculation method as configured by its corresponding component value of the currently-stored baseline setting.

11. The baseline unit as claimed in claim 10, configured to control the component values of the baseline setting separately, such as based on the respective measures of the gradients of the corresponding sensor signals.

12. The baseline unit as claimed in claim 1, wherein:
the baseline-calculation method comprises low-pass filtering defined by a filter parameter; and
the baseline setting defines a value of the filter parameter.

13. The baseline unit as claimed in claim 12, wherein the filter parameter comprises a time constant, a forgetting factor and/or a corner frequency which defines the low-pass filtering, optionally a passband of the low-pass filtering.

14. The baseline unit as claimed in claim 12, wherein the control of the stored baseline setting in dependence upon the measures of the gradients comprises controlling the baseline setting to increase the size of a passband of the low-pass filtering.

15. The baseline unit as claimed in claim 1, wherein:
$N \geq 3$, or $N \geq 4$, or $N \geq 8$; and/or
each sensor signal is indicative of an applied force; and/or
the force sensors of the sensor system are arranged to detect an applied force corresponding to a press of at least one virtual button.

16. The baseline unit as claimed in claim 1, configured to store the baseline setting.

17. The baseline unit as claimed in claim 1, wherein the monitored measures of the gradients are smoothed measures of the gradients obtained by smoothing corresponding instantaneous measures of the gradients of the respective sensor signals, optionally wherein the baseline unit is configured to calculate the smoothed measures of the gradients from the corresponding instantaneous measures of the gradients, optionally by low-pass filtering.

18. A sensor system or a host device, comprising:
the baseline unit as claimed in claim 1; and
the N force sensors.

* * * * *

UNITED STATES PATENT AND TRADEMARK OFFICE
CERTIFICATE OF CORRECTION

PATENT NO. : 11,662,259 B2
APPLICATION NO. : 17/128922
DATED : May 30, 2023
INVENTOR(S) : Peso Parada et al.

It is certified that error appears in the above-identified patent and that said Letters Patent is hereby corrected as shown below:

In the Claims

In Column 16, Line 66, in Claim 3, delete "a baseline signal" and insert -- the baseline signal --, therefor.

Signed and Sealed this
Twelfth Day of September, 2023

Katherine Kelly Vidal
*Director of the United States Patent and Trademark Office*